(12) United States Patent
Amodeo, Jr.

(10) Patent No.: US 6,641,225 B1
(45) Date of Patent: Nov. 4, 2003

(54) DECORATIVE TIRE SIDEWALL SHIELD

(76) Inventor: Frank Amodeo, Jr., 16a Labonne Vie Dr., Patchogue, NY (US) 11772

( * ) Notice: Subject to any disclaimer, the term of this patent is extended or adjusted under 35 U.S.C. 154(b) by 0 days.

(21) Appl. No.: 10/093,327

(22) Filed: Mar. 6, 2002

(51) Int. Cl.[7] ............................................. B60B 7/00
(52) U.S. Cl. ......................... 301/37.103; 301/37.102; 301/37.22; 301/37.33
(58) Field of Search .................. 301/37.101, 37.24, 301/37.32, 37.33, 37.109, 37.42, 37.103, 37.102, 37.31, 37.22

(56) References Cited

U.S. PATENT DOCUMENTS

| | | | |
|---|---|---|---|
| 3,253,634 A | | 5/1966 | De Young |
| 3,382,908 A | | 5/1968 | Palmquist et al. |
| 3,946,782 A | | 3/1976 | Petrasek et al. |
| 4,047,800 A | | 9/1977 | DiBease |
| 4,131,322 A | * | 12/1978 | Beisch et al. ............ 301/37.36 |
| 4,441,762 A | * | 4/1984 | Segal .................... 301/37.105 |
| 4,470,638 A | * | 9/1984 | Bartylla .................. 301/37.34 |
| 4,547,021 A | * | 10/1985 | Abbate Daga ........... 301/37.35 |
| 5,105,308 A | | 4/1992 | Holley et al. |
| 5,155,626 A | | 10/1992 | Lester |
| 5,659,989 A | * | 8/1997 | Hsiao et al. ................... 40/587 |
| 5,695,257 A | * | 12/1997 | Wright et al. .......... 301/37.371 |
| 5,893,614 A | * | 4/1999 | Dennis ..................... 301/37.41 |
| 6,464,303 B2 | * | 10/2002 | Stembridge .............. 301/37.31 |
| 6,467,852 B1 | * | 10/2002 | Polka ...................... 301/37.32 |
| 6,471,302 B1 | * | 10/2002 | Romijn .................... 301/37.25 |

* cited by examiner

Primary Examiner—S. Joseph Morano
Assistant Examiner—Long Bao Nguyen
(74) Attorney, Agent, or Firm—Michael I Kroll (57) ABSTRACT

Disclosed is a decorative tire sidewall shield cover that provides the tire sidewall (16) with added beauty and protection. The device is a substantially planar ring-like member having a central aperture (42) substantially of the same diameter as the wheel or hub (20) opening of the tire (18). The decorative sidewall shield can also have a centrally disposed flange or lip (30) that will be positioned between the tire rim (18) and wheel rim (20) being held in place by tire air pressure. In addition to an exterior shield for tires such as motor vehicles, the tire shield covers both sides of a tire, such as for a motorcycle. The material used would have abrasion resistance properties.

19 Claims, 10 Drawing Sheets

DECORATIVE TIRE SIDEWALL SHIELD

BACKGROUND OF THE INVENTION

1. Field of the Invention

The present invention relates generally to tire covers and, more specifically, to decorative tire sidewall shield covers that provide the tire sidewall with added protection. The device is a substantially planar material having a central aperture substantially of the same diameter as the hub opening of the tire. The decorative sidewall shield can also have a centrally disposed flange that will be positioned between the tire rim and wheel rim.

In addition to an exterior shield for tires such as motor vehicles, the present invention provides for a tire shield for both sides of a tire, such as for a motorcycle. An elastic element having perforations may be used to secure the two devices retaining lips to the wheel.

The material used in the sidewall shield can be any materials having abrasion resistance properties. This would also include decorative material which glow, hold a hologram image, reflective material and lettering that can be applied to the surface of the shield.

2. Description of the Prior Art

There are other reflective tire devices designed for increasing nighttime visibility. Typical of these is U.S. Pat. No. 3,253,634 issued to Young on May 31, 1966.

Another patent was issued to Palmquist on May 14, 1968 as U.S. Pat. No. 3,382,908. Yet another U.S. Pat. No. 3,946,782 was issued to Petrasek on Mar. 30, 1996 and still yet another was issued on Oct. 13, 1996 to Lester as U.S. Pat. No. 5,155,626.

Another patent was issued to DiBease on Sep. 13, 1977 as U.S. Pat. No. 4,047,800. Yet another U.S. Pat. No. 5,105,308 was issued to Holly on Apr. 14, 1992.

U.S. Pat. No. 3,253,634

Inventor: Young

Issued: May 31, 1966

A pneumatic tire including a generally toroidal shaped carcass, spaced beads having rubber sidewalls and rubber tread, at least one of said sidewalls having a plurality of circumferentially extending grooves and having a layer of substantially transparent elastomer secured in at least one groove therein, said layer having spangles of light reflective metal dispersed in said layer, said spangles having a color contrasting with the color of the rubber in the remainder of said sidewall, said spangles having faces which are predominantly oriented so that said faces are substantially parallel to the surface of said layer.

U.S. Pat. No. 3,382,908

Inventor: Palmquist

Issued: May 14, 1968

A pneumatic tire having durable flexible stretchable and elastic reflex-reflective sidewall portions that provide a bright cone-shaped substantially coaxial return of incident light as a night time signal of the location or movement of a vehicle equipped with the tire comprising a tire casing and a monolayer of discrete reflex-reflective elements partially embedded and permanently bonded in the exterior of the casing sidewall, the reflex-reflective elements being embedded in elastomeric material that has elastomeric properties similar to those of the elastomers of the rest of the casing sidewall, has good specific adhesion to the contacted surface of the elements, and is strongly adhere to the rest of the casing sidewall.

U.S. Pat. No. 3,946,782

Inventor: Petrasek

Issued: Mar. 30, 1976

This disclosure relates to a vehicle tire which is provided with light reflective elements. These light reflective elements are so situated on the tire that they give certain, predetermined optical effects when the tire is being operated in certain speed ranges. These effects give the observer clear optical warning that a vehicle is present and moreover, an indication of the speed of the vehicle.

U.S. Pat. No. 5,155,626

Invention: Lester

Issued: Oct. 13, 1992

A passive reflective safety device for vehicles formed as a wheel cover, a fixed geometric shape attached to a rotational part of the vehicle or as a rotating wind driven vane attached to the vehicle. Each of the devices functions as a passive beacon to alert persons on other vehicle of the presence of the user's vehicle. Each device is fabricated of ridged sheet material with a reflective layer applied to a visible side of the device. If transparent sheet material is used, the reflective layer may be applied to the inboard side of the device. The wind vane device may contain a governor to limit the rotational speed. A wind deflector may be installed in front of the vane device to encourage rotation in one direction.

U.S. Pat. No. 4,047,800

Inventor: DiBease

Issued: Sep. 13, 1977

A reflector disc has a light reflective surface and a rim. A mounting device mounts the reflector disc to the rear axle of a bicycle in a manner whereby the disc is positioned vertically and perpendicular to the plane of the rear wheel with the rim of the disc in abutment with the wheel whereby rotation of the rear wheel causes rotation of the disc.

U.S. Pat. No. 5,105,308

Inventor: Holley

Issued: Apr. 14, 1992

An apparatus in association with a bicycle tire and like which may be retractably secured to the tire, whereupon an elongate strip formed with spaced cutouts permit-securement of the elongate strip to an exterior sidewall of the tire, wherein the strip is formed of a multi-layered, multi-colored strip organization to effect reflection of the tire in use within an associated bicycle. Triangular reflective segments may be adhesively and retractably mounted into the cutouts in securement of the organization to the associated tire.

While these tire covers may be suitable for the purposes for which they were designed, they would not be as suitable for the purposes of the present invention, as hereinafter described.

SUMMARY OF THE PRESENT INVENTION

The present invention discloses a decorative tire sidewall shield cover that provides the tire sidewall with added beauty and protection. The device is a substantially planar ring-like member having a central aperture substantially of the same diameter as the wheel or hub opening of the tire. The decorative sidewall shield can also have a centrally disposed flange or lip that will be positioned between the tire rim and wheel rim being held in place by tire pressure. In addition to an exterior shield to cover tires such as motor vehicles, the present invention provides for a tire shield for both sides of a tire, such as for a motorcycle. An elastic element having perforations therein may be used to secure the retaining lips of the two devices to the wheel. The material used in the sidewall shield can be any materials having abrasion resistance properties. This would also include decorative material which glow, hold a hologram image, or have reflective material and lettering that can be applied to the surface of the shield.

A primary object of the present invention is to provide a shield for a tire sidewall.

Another object of the present invention is to provide a tire sidewall shield having decorative qualities.

Yet another object of the present invention is to provide a tire sidewall shield flange that is fixedly positioned between the tire rim and wheel hub rim.

Still yet another object of the present invention is to provide a tire sidewall shield having an adhesive backing for securement to the tire wall.

Yet another object of the present invention is to provide a tire sidewall shield whereupon customizable stick on lettering can be applied to enhance the aesthetic appearance of said device.

Still yet another object of the present invention is to provide a tire sidewall shield having spaced apart shield members connected by an elastic member.

Additional objects of the present invention will appear as the description proceeds.

The present invention overcomes the shortcomings of the prior art by providing a sidewall shield that protects the sidewall of a tire. The sidewall shield may have an interior flange that is fixedly positioned between the tire and wheel rim.

The exterior surface of the sidewall shield can have a decorative appearance that can improve visibility especially during nighttime use.

Additionally on the interior surface of the sidewall shield there can be an adhesive layer for bonding the sidewall shield to the tire.

In the case where the sidewall shield is used on motorcycle tires, which would require a shield on both sides of the tire, an elastic member can be used to hold one shield to another.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 wheel
14 motorcycle
16 side wall
18 tire
20 rim
22 cutouts
24 grooves
26 stick-on lettering
28 customizable surface
30 retaining lip
32 adhesive
34 adhesive backing
36 back side
38 elastic piece
40 perforations
42 central aperture

DETAILED DESCRIPTION OF THE PREFERRED EMBODIMENT(S)

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
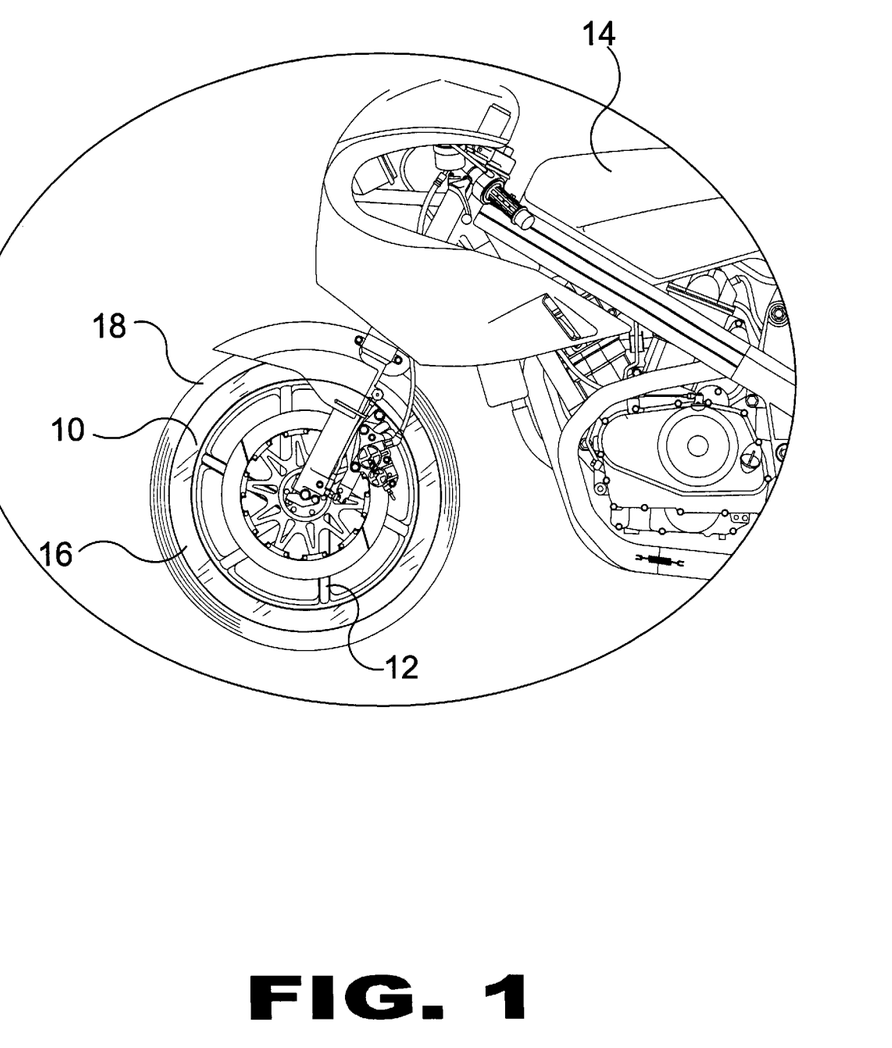
FIG. 1 is a perspective view of the present invention.

Turning to FIG. 1, shown therein is a perspective view of the side wall shield of the present invention 10 showing the present invention applied to the front wheel 12 of a motorcycle 14 providing a highly reflective surface to enhance visibility at night and also to provide extra protection to the side wall 16 of the tire 18.

Figure 2:
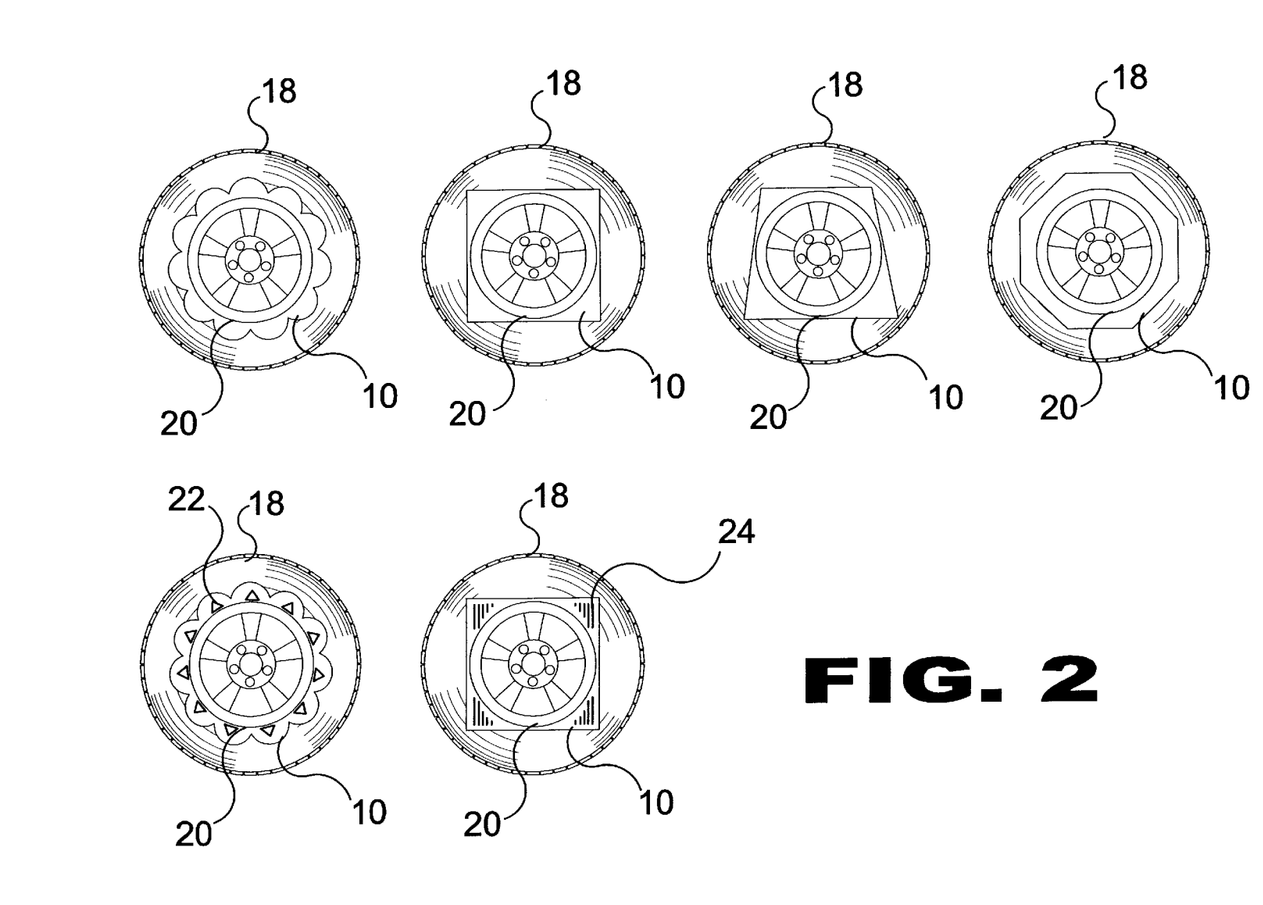
FIG. 2 is an isometric view of the present invention.

Turning to FIG. 2, shown therein is a front view of the present invention 10 showing the present invention having a retaining lip (not shown but see FIG. 4) to secure itself in-between the rim 20 and tire 18, and being held in place due to air pressure being exerted from the tire 18 against the rim 20. Shown are various shapes and sizes of the present invention 10, with one having cutouts 22 and grooves 24 but the present invention is not limited to this. The outside surface can be just about anything.

Figure 3:
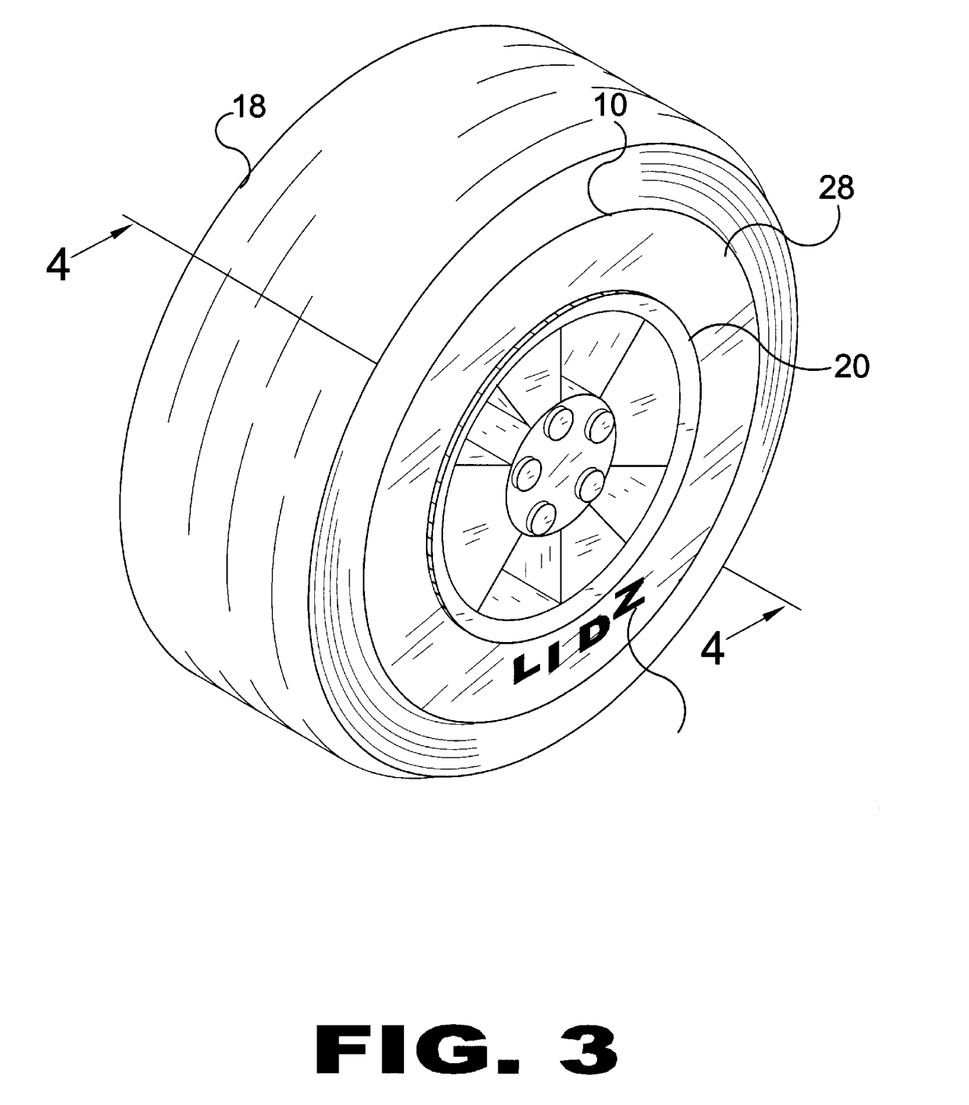
FIG. 3 is an isometric view of the present invention.

Turning to FIG. 3, shown therein is an isometric view of the present invention 10 showing the present device and its relation and positioning corresponding to the tire 18 and rim 20 of the wheel. Also shown is the presence of customizable stick-on lettering 26 so that an optional word or phase may be presented on the customizable surface 28 or reflective surface.

Figure 4:
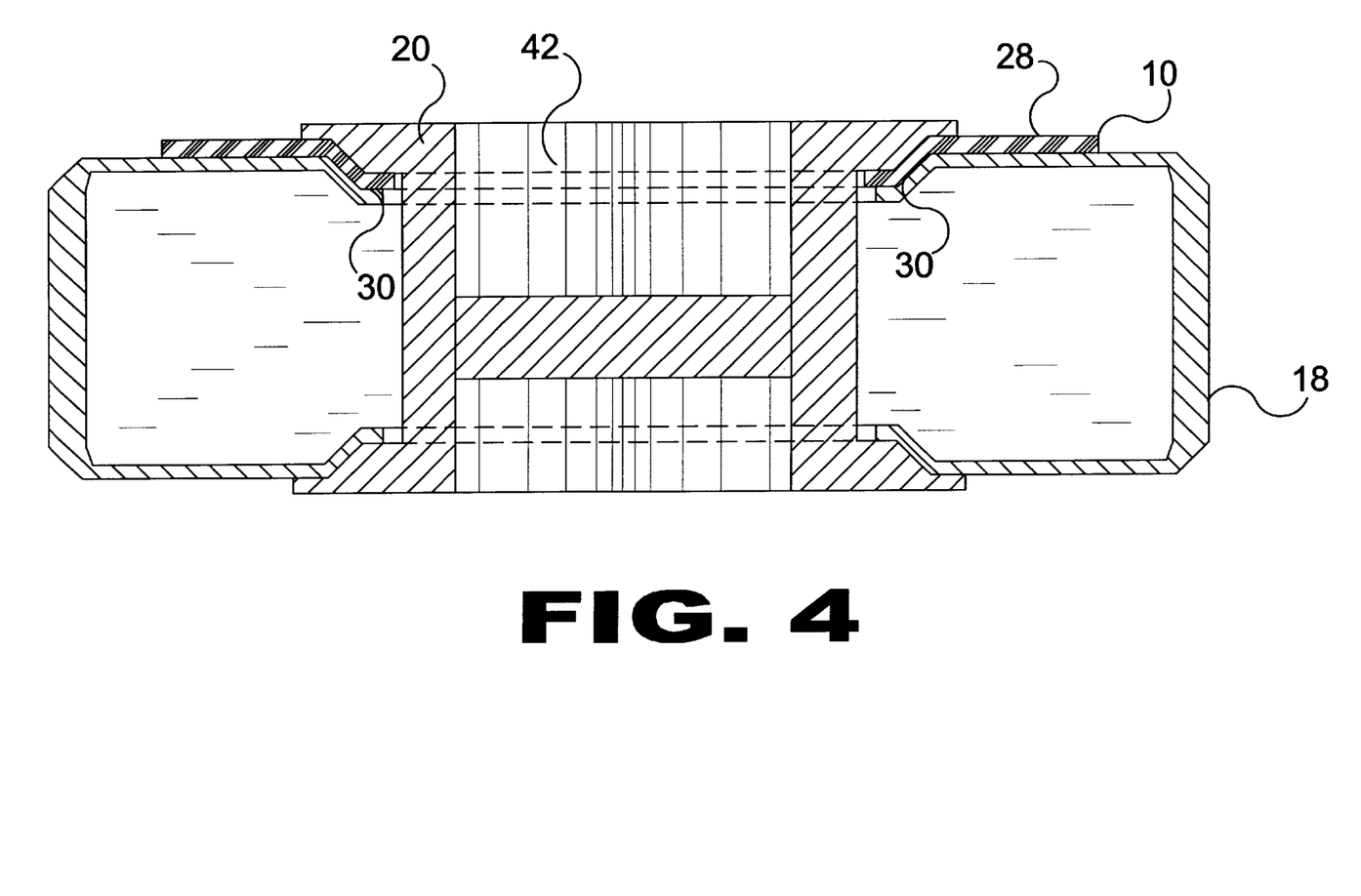
FIG. 4 is a cross section of the present invention.

Turning to FIG. 4, shown therein is a cross section of the present invention 10 showing the relationships and placement of the retaining lip 30 in conjunction to the tire 18 and rim 20. The customizable surface 28 is also shown. Air pressure exerted by tire 18 against rim 20 holds the retaining lip 30 in place. Central aperture 42 is also shown.

Figure 5:
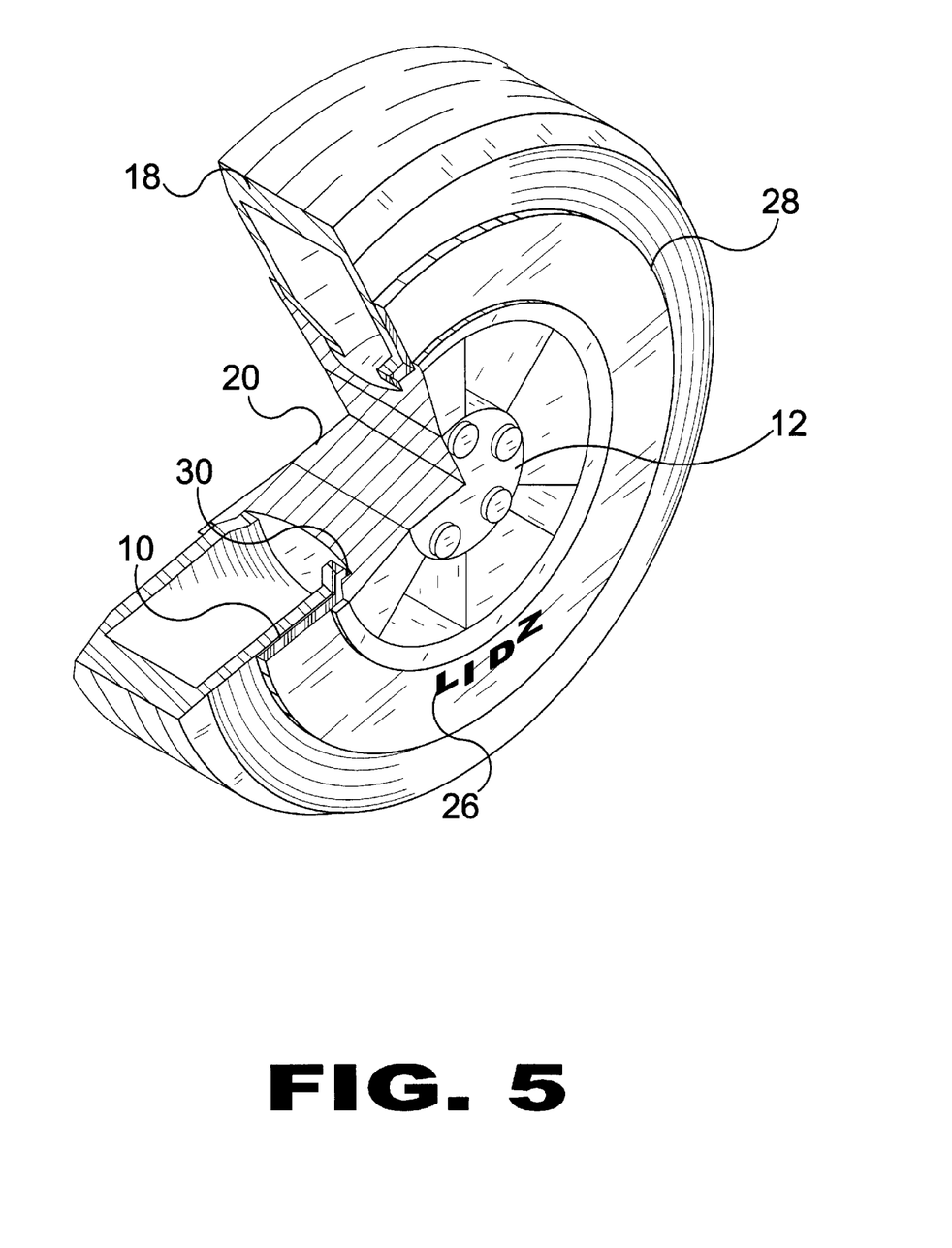
FIG. 5 is a cut away view of the present invention.

Turning to FIG. 5 shown therein is a cut away view of the present invention 10 showing the relationships between the present invention 10 and the rim 20 and tire 18 of an automobile wheel 12. It can be seen that the present invention 10 is planar circular ring having a front side and a back side with the ring having an inner edge and an outer edge and that the inner edge has the retaining lip 30 thereon. Shown is the present invention 10 covering greater than half of the width of the tire sidewall. Other elements previously disclosed are also shown.

Figure 6:
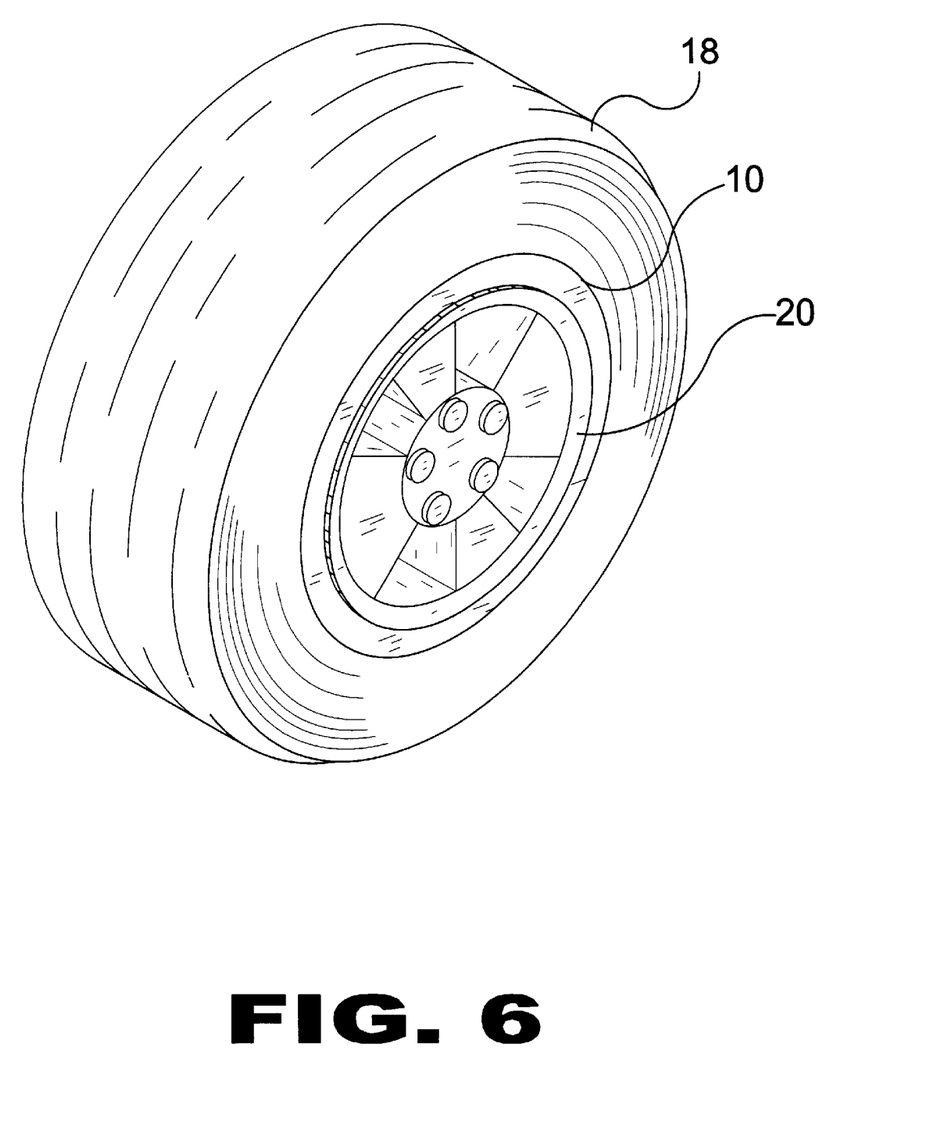
FIG. 6 is an isometric view of a variation in the surface area of the present invention.

Turning to FIG. 6, shown therein is an isometric view of a variation in the size of the surface area of the present invention showing the present invention 10 with an alternate design having the reflective surface smaller to provide a slim bar rather than a large surface to cover the tire 18. Rim 20 is also shown. Shown is the present invention 10 covering less than 1/3 of the width of the tire sidewall.

Figure 7:
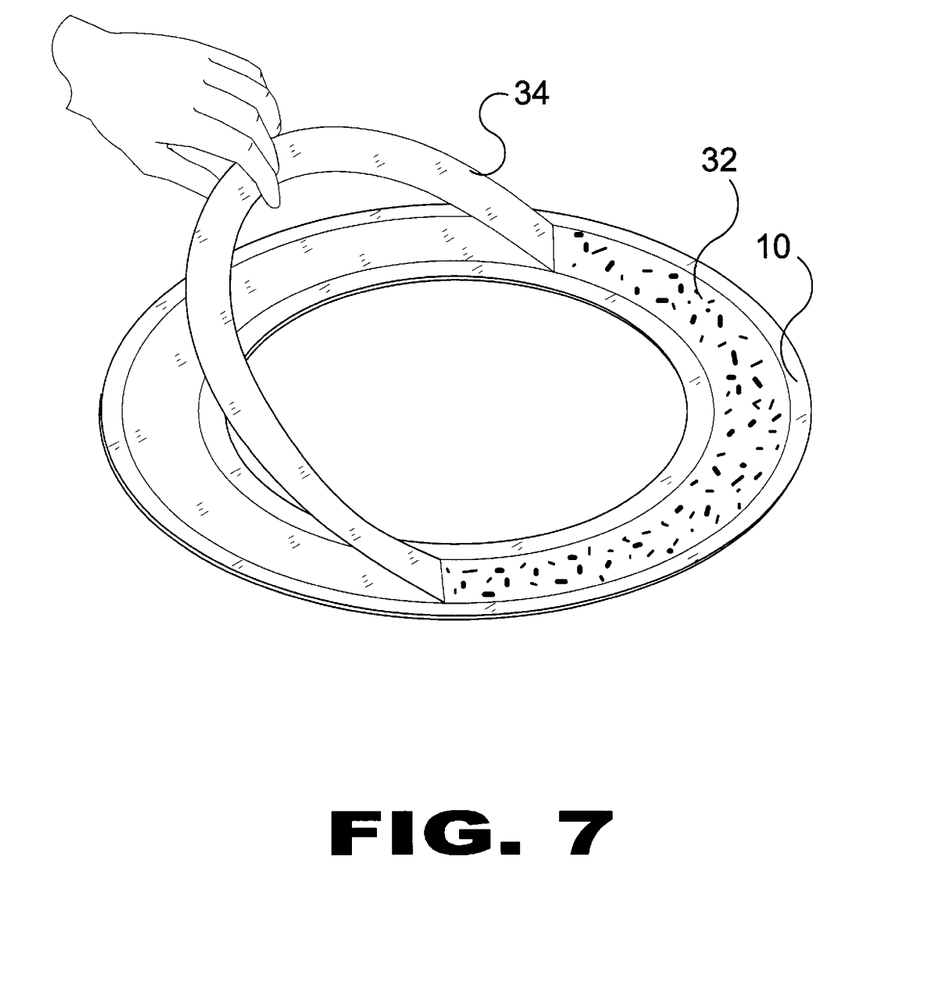
FIG. 7 is an isometric view of an additional element of the present invention.

Turning to FIG. 7, shown therein is an isometric view of an additional element of the present invention showing a different design of the present invention 10 featuring an adhesive 32 on its back rather than a retaining lip to secure the sidewall shield 10 to the tire. Also shown is the removal of the adhesive backing tape 34 prior to installation.

Figure 8:
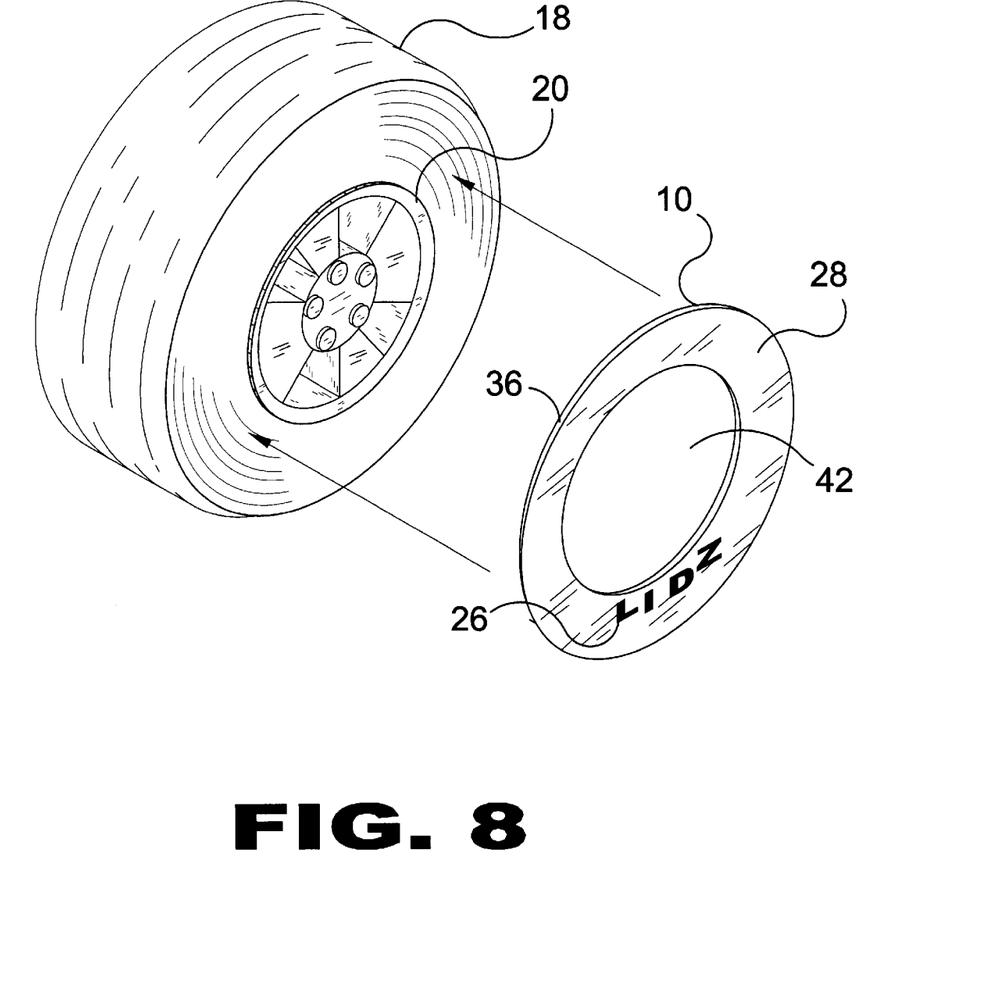
FIG. 8 is an isometric view of the present invention having adhesive lettering.

Turning to FIG. 8, shown therein is an isometric view of the present invention 10 having adhesive (not shown but see FIG. 7) on the sidewall shield having an exposed amount of adhesive on the back side 36 ready to be installed against the tire 18. Also shown is central aperture 42 and the application of customizable lettering 26. Other elements previously shown are also disclosed.

Figure 9:
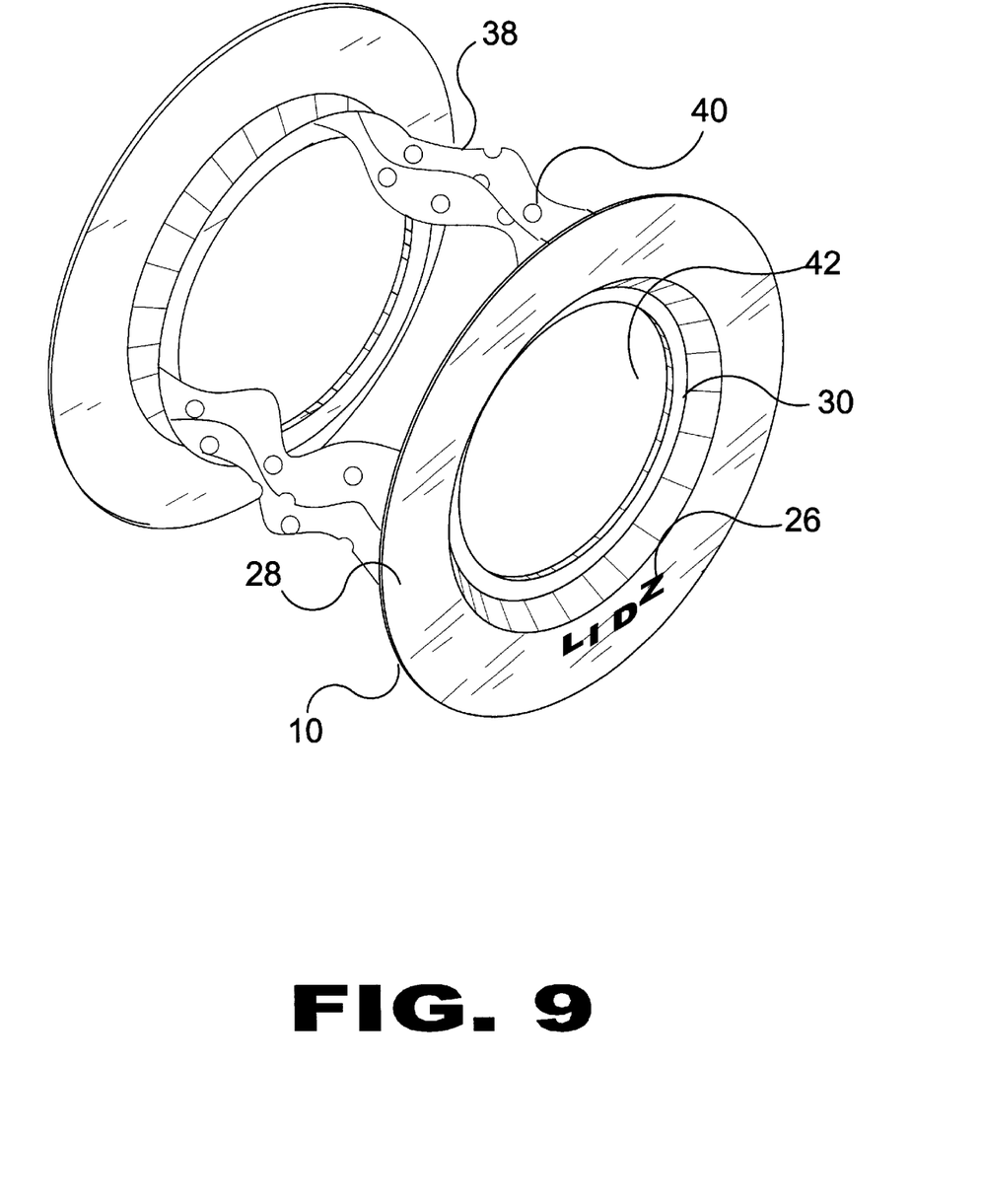
FIG. 9 is an isometric view of an additional element of the present invention.

Turning to FIG. 9, shown therein is an isometric view of an additional element of the present invention 10 showing the present invention designed to accommodate a motorcycle wheel featuring a plurality of elastic pieces 38 with a plurality of perforations 40 to aid in the stability and securement of the present invention to the tire. Other elements previously shown are also disclosed.

Figure 10:
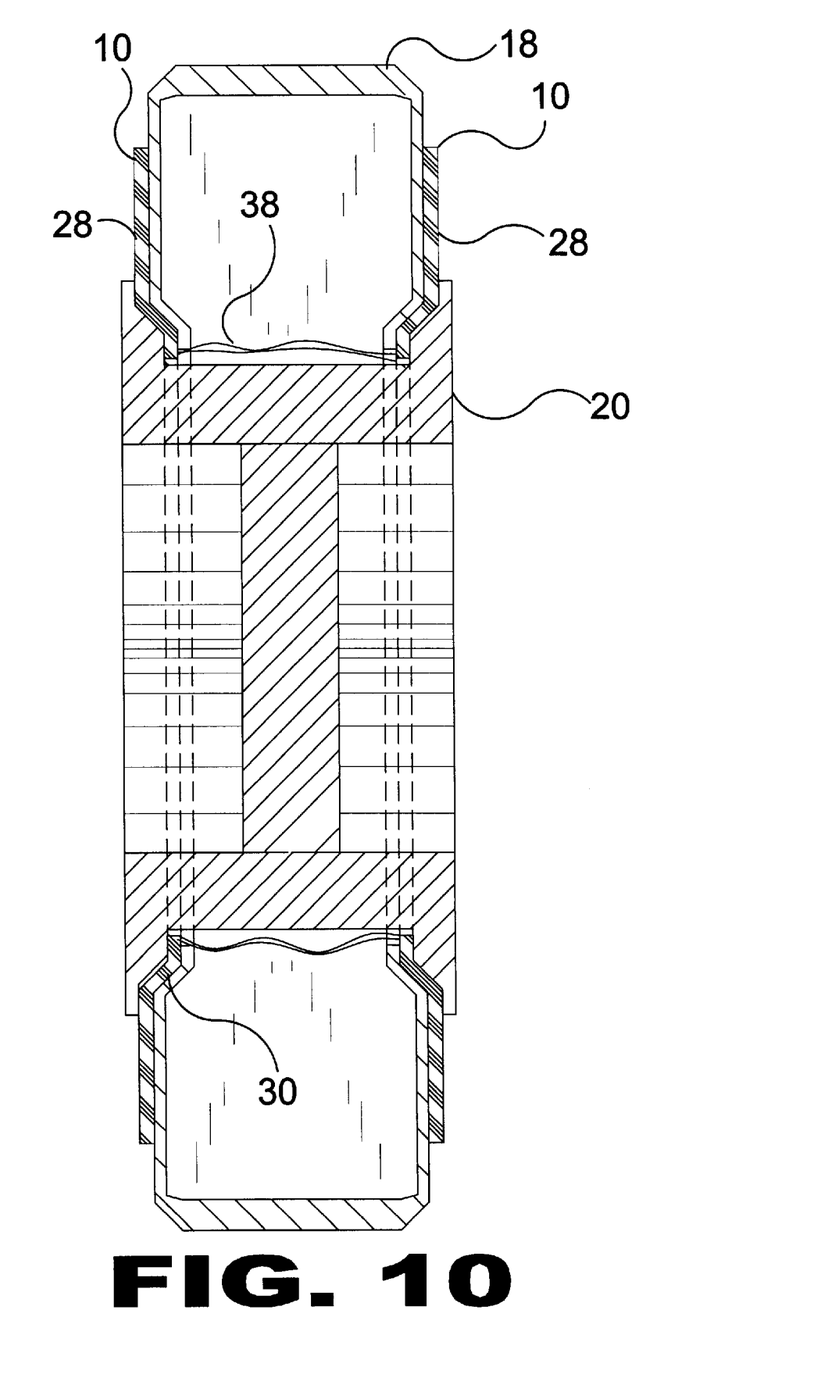
FIG. 10 is a cross section of an additional element of the present invention.

Turning to FIG. 10, shown therein is a cross sectional view of an additional element of the present invention 10 in the form of an elastic member 38 that may or may not be installed on a motorcycle. Shown is the elastic member 38 installed on the tire 18 of a motorcycle. The elastic member 38 may be one piece of elastic going completely around inside of side wall or retaining lip. Also shown is the placement and function of the elastic members 38 helping to secure the present invention to the tire 18 so that opposite sides of motorcycle tire are provided with a customizable surface 28. One end of the elastic member 38 connects to the back of one side wall shield 10 and the other end connects to the back of the other side wall shield. Other elements previously shown are also disclosed.

I claim:

1. An apparatus for a decorative attachment to an inflatable tire mounted onto the rim of a wheel, comprising:
   a) a circular ring, said ring being substantially planar, said ring having a front side and a back side, said ring having an inner edge and an outer edge thereon;
   b) said ring having a central aperture therein; and,
   c) means for mounting said ring onto the wheel wherein said ring is secured contiguously to the tire and comprises a lip disposed on said inner edge of said circular ring, said lip being disposed between the wheel rim and the tire.

2. The apparatus of claim 1, wherein said means for mounting further comprises an adhesive disposed on said back side of said ring.

3. The apparatus of claim 2, said adhesive further comprising removable backing tape for covering said adhesive prior to disposition on said back side of said ring.

4. The apparatus of claim 1, wherein said ring further comprises a customizable surface.

5. The apparatus of claim 4, wherein said ring further comprises stick-on lettering.

6. The apparatus of claim 5, wherein said ring has grooves therein, said grooves forming an elongated aperture therein.

7. The apparatus of claim 6, wherein said ring has cutouts therein, said cutouts forming an aperture therein.

8. The apparatus of claim 7, wherein said customizable surface is relatively large and covers greater than half of the tire side wall.

9. The apparatus of claim 8, wherein said customizable surface is relatively small and covers less than one-third of the tire side wall.

10. An apparatus for a decorative attachment to an inflatable tire mounted onto the rim of a wheel, comprising:
    a) a pair of circular rings, said rings being substantially planar, said rings having a front side and a back side, said rings having an inner edge and an outer edge thereon;
    b) said pair of rings each having a central aperture therein; and,
    c) means for mounting said pair of rings onto the wheel wherein each of said rings is secured contiguously to each opposing side of the tire.

11. The apparatus of claim 10, wherein said means for mounting further comprises at least one elastic member for connecting said pair of rings to the tire.

12. The apparatus of claim 10, wherein said means for mounting further comprises multiple elastic members having multiple perforations therein for connecting said pair of rings to the tire.

13. The apparatus of claim 12, wherein said elastic members each have a first end and a second end, said first end being connected to said back side of said first ring, and said second end connected to said backside of said second ring so that said rings are connected to each other.

14. The apparatus of claim 13, wherein said rings further comprise a customizable surface.

15. The apparatus of claim 14, wherein said rings further comprise stick-on lettering.

16. The apparatus of claim 15, wherein said rings have grooves therein, said grooves forming an elongated aperture therein.

17. The apparatus of claim 16, wherein said rings have cutouts therein, said cutouts forming an aperture therein.

18. The apparatus of claim 17, wherein said customizable surface is relatively large and covers greater than half of the tire side wall.

19. The apparatus of claim 18, wherein said customizable surface is relatively small and covers less than one-third of the tire side wall.

* * * * *